United States Patent
Einberg

(10) Patent No.: US 10,152,584 B2
(45) Date of Patent: *Dec. 11, 2018

(54) USING SENSOR DATA TO AUTHENTICATE A USER FOR A COMPUTER DEVICE

(71) Applicant: ASSA ABLOY AB, Stockholm (SE)

(72) Inventor: Fredrik Einberg, Huddinge (SE)

(73) Assignee: ASSA ABLOY AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/532,674

(22) PCT Filed: Dec. 2, 2015

(86) PCT No.: PCT/EP2015/078401
§ 371 (c)(1),
(2) Date: Jun. 2, 2017

(87) PCT Pub. No.: WO2016/087541
PCT Pub. Date: Jun. 9, 2016

(65) Prior Publication Data
US 2017/0357791 A1    Dec. 14, 2017

(30) Foreign Application Priority Data

Dec. 4, 2014 (EP) ..................................... 14196313

(51) Int. Cl.
*G06F 21/34* (2013.01)
*G06F 21/32* (2013.01)
*G06F 3/01* (2006.01)

(52) U.S. Cl.
CPC .............. *G06F 21/34* (2013.01); *G06F 3/017* (2013.01); *G06F 21/32* (2013.01)

(58) Field of Classification Search
CPC ..... G07C 9/00309; G06F 21/40; G06F 21/34; G06F 21/32; B60R 25/24; H04W 12/06;
(Continued)

(56) References Cited

U.S. PATENT DOCUMENTS 8,040,218 B2 * 10/2011 Hays .................. G07C 9/00309
340/5.73
8,085,170 B2 * 12/2011 Li ........................... G06F 3/023
340/407.2

(Continued)

FOREIGN PATENT DOCUMENTS

DE      102012220130      5/2013
EP      2 034 389 A1      3/2009
(Continued)

OTHER PUBLICATIONS

U.S. Appl. No. 15/532,652, filed Jun. 2, 2017, Einberg et al.
(Continued)

*Primary Examiner* — Brian Miller
(74) *Attorney, Agent, or Firm* — Sheridan Ross P.C.

(57) ABSTRACT

It is presented a method for conditionally authenticating a user for access to a computer device, the method being performed in an access control device connected to a computer device. The method comprises the steps of: obtaining first sensor data being based on a mobile device sensing a physical movement of a user; obtaining second sensor data being based on a stationary sensor sensing a physical movement of a user; determining whether the first sensor data matches the second sensor data; and sending a match signal to the computer device when the first sensor data matches the second sensor data.

11 Claims, 6 Drawing Sheets

(58) Field of Classification Search
CPC ............... H04W 12/08; H04L 63/0861; H04L 63/0853; H04L 2463/082
See application file for complete search history.

(56) References Cited

U.S. PATENT DOCUMENTS

| | | | |
|---|---|---|---|
| 8,593,249 B2 | 11/2013 | Bliding et al. | |
| 9,450,682 B2* | 9/2016 | Herman | H04B 11/00 |
| 9,740,838 B2* | 8/2017 | Hill | G06F 21/32 |
| 2008/0136678 A1 | 6/2008 | Harrington | |
| 2009/0083847 A1* | 3/2009 | Fadell | G06F 21/316 |
| | | | 726/16 |
| 2010/0218249 A1 | 8/2010 | Wilson et al. | |
| 2013/0127591 A1 | 5/2013 | Shay et al. | |
| 2014/0283013 A1 | 9/2014 | Marco et al. | |
| 2014/0325614 A1 | 10/2014 | Rhelimi | |
| 2015/0213244 A1* | 7/2015 | Lymberopoulos | G06F 21/32 |
| | | | 726/18 |
| 2016/0277925 A1* | 9/2016 | Bengtsson | H04B 11/00 |
| 2016/0342781 A1* | 11/2016 | Jeon | G06F 21/32 |

FOREIGN PATENT DOCUMENTS

| | | |
|---|---|---|
| EP | 2 395 446 A1 | 12/2011 |
| WO | WO 2014/153528 A2 | 9/2014 |

OTHER PUBLICATIONS

International Search Report and Written Opinion prepared by the European Patent Office dated Feb. 3, 2016, for International Application No. PCT/EP2015/078401.

International Preliminary Report on Patentability prepared by the European Patent Office dated Oct. 4, 2016, for International Application No. PCT/EP2015/078401.

Second Written Opinion prepared by the European Patent Office dated Nov. 4, 2016, for International Application No. PCT/EP2015/078401.

International Search Report and Written Opinion prepared by the European Patent Office dated Jan. 15, 2016, for International Application No. PCT/EP2015/078399.

International Preliminary Report on Patentability prepared by the European Patent Office dated Oct. 4, 2016, for International Application No. PCT/EP2015/078399.

Second Written Opinion prepared by the European Patent Office dated Oct. 31, 2016, for International Application No. PCT/EP2015/078399.

Official Action for U.S. Appl. No. 15/532,652, dated Apr. 16, 2018 11 pages.

Notice of Allowance for U.S. Appl. No. 15/532,652, dated Jul. 30, 2018 9 pages.

Corrected Notice of Allowability for U.S. Appl. No. 15/532,652, dated Oct. 3, 2018 5 pages.

* cited by examiner

USING SENSOR DATA TO AUTHENTICATE A USER FOR A COMPUTER DEVICE

CROSS REFERENCE TO RELATED APPLICATIONS

This application is a national stage application under 35 U.S.C. 371 and claims the benefit of PCT Application No. PCT/EP2015/078401 having an international filing date of 2 Dec. 2015, which designated the United States, which PCT application claimed the benefit of European Patent Application No. 14196313.2 filed 4 Dec. 2014, the disclosures of each of which are incorporated herein by reference.

TECHNICAL FIELD

The invention relates to conditionally authenticating a user for access to a computer device. In particular, sensor data is used for the authentication.

BACKGROUND

Authentication for computer devices can occur in many different ways. Still today, authentication using a username and password is most common. While this type of authentication still works, it is often complicated and cumbersome to enter a username and password which is secure enough to be difficult to break.

US-2010/218249 presents a system and/or a method that facilitates authentication of a user in a surface computing environment. A device or authentication object can be carried by a user and employed to retain authentication information. An authentication component can obtain the authentication information from the device and analyze the information to verify an identity of the user. A touch input component can ascertain if a touch input is authentication by associating touch input with the user. In addition, authentication information can be employed to establish a secure communications channel for transfer of user data. However, access control to computers always benefit from improved usability with the same or higher security.

EP-2 395 446 presents a method for pairing a first device (such as a handset) with a second device (such as a personal computer), said first and second devices being linked to a remote server, said first device comprising an accelerometer and said second device being linked to a third device. The method comprises the following steps: the first device and the second device capture a common movement respectively to the first and to the third devices; the first device and the second device send data resulting from the common movement to the remote server so as to create a unique identifier of the movement; the remote server compares the identifier of the movement of the first device and the identifier of the movement of the second device, and if the identifiers match, the remote server pairs operations performed from the first and the second devices. However, this method requires the user to hold the first device while performing a movement using e.g. a mouse or a touchpad which can be correlated. Such a correlation is cumbersome and resource demanding.

SUMMARY

It is an object to improve control of how access control is performed based on correlated movement which is less resource demanding than in the prior art.

According to a first aspect, it is presented a method for conditionally authenticating a user for access to a computer device, the method being performed in an access control device connected to the computer device. The method comprises the steps of: obtaining first sensor data being based on a mobile device sensing a physical movement of a user; obtaining second sensor data being based on a user input device detecting user input from a user; determining whether the first sensor data matches the second sensor data by determining whether the first sensor data reflects two taps of the user and corresponds to two taps of the user reflected in the second sensor data, and wherein the first sensor data and the second sensor data are determined to match only when the time difference between the two taps of the first sensor data corresponds to the time difference between the two taps of the second sensor data; and sending a match signal to the computer device when the first sensor data matches the second sensor data.

The method may further comprise the steps of: exchanging digital authentication data with the mobile device; determining whether the mobile device is authenticated based on the digital authentication data; and wherein the step of sending a match signal is only performed when the mobile device is authenticated.

The step of determining whether the first sensor data matches the second data may comprise determining that the first sensor data matches the second data only when a time difference between corresponding a physical movement is less than a threshold time difference.

In the step of obtaining first sensor data, the first sensor data may be based on accelerometer data.

According to a second aspect, it is presented an access control device arranged to conditionally authenticate a user for access to a computer device. The access control device comprises: a processor; and a memory storing instructions that, when executed by the processor, causes the access control device to: obtain first sensor data being based on a mobile device sensing a physical movement of a user; obtain second sensor data being based on a user input device detecting user input of a user; determine whether the first sensor data matches the second sensor data by determining whether the first sensor data reflects two taps of the user and corresponds to two taps of the user reflected in the second sensor data, and wherein the first sensor data and the second sensor data are determined to match only when the time difference between the two taps of the first sensor data corresponds to the time difference between the two taps of the second sensor data; and send a match signal to the computer device, connected to the access control device, when the first sensor data matches the second sensor data.

The memory may further store instructions that, when executed by the processor, causes the access control device to: exchange digital authentication data with the mobile device; determine whether the mobile device is authenticated based on the digital authentication data; and wherein the instructions to send a match signal comprise instructions that, when executed by the processor, causes the access control device to only send the match signal when the mobile device is authenticated.

The instructions to determine whether the first sensor data matches the second data may comprise instructions that, when executed by the processor, causes the access control device to determine that the first sensor data matches the second data only when a time difference between a corresponding physical movement is less than a threshold time difference.

The instructions to obtain first sensor data may comprise instructions that, when executed by the processor, causes the access control device to obtain the first sensor data based on accelerometer data.

According to a third aspect, it is presented a computer device comprising the access control device according to the second aspect.

According to a fourth aspect, it is presented a computer program for conditionally authenticating a user for access to a computer device. The computer program comprises computer program code which, when run on a access control device causes the access control device to: obtain first sensor data being based on a mobile device sensing a physical movement of a user; obtain second sensor data being based on a user input device detecting user input from a user; determine whether the first sensor data matches the second sensor data by determining whether the first sensor data reflects two taps of the user and corresponds to two taps of the user reflected in the second sensor data, and wherein the first sensor data and the second sensor data are determined to match only when the time difference between the two taps of the first sensor data corresponds to the time difference between the two taps of the second sensor data; and send a match signal to the computer device, connected to the access control device, when the first sensor data matches the second sensor data.

According to a fifth aspect, it is presented a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
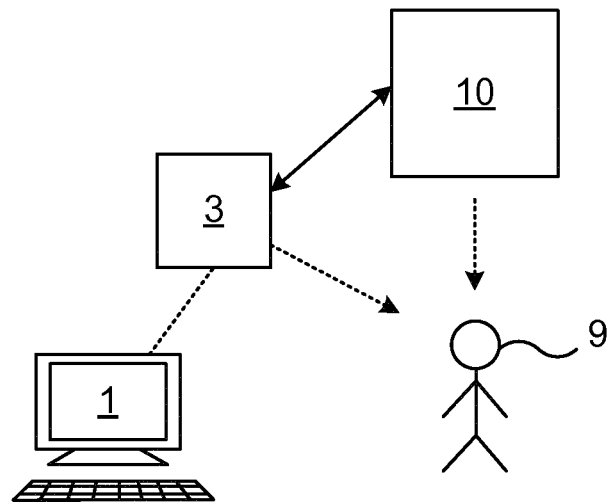
FIGS. 1A-C are schematic diagrams showing environments in which embodiments presented herein can be applied.
Figure 1B:
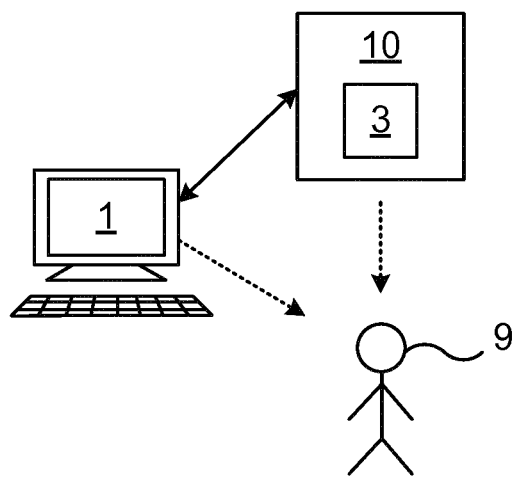
Figure 1C:
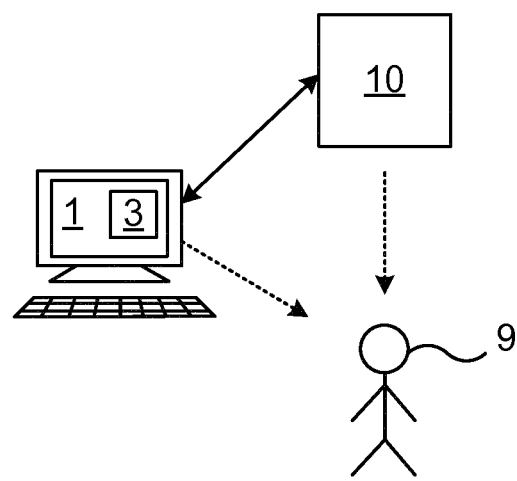

FIGS. 1A-C are schematic diagrams showing environments in which embodiments presented herein can be applied.

Looking first to FIG. 1A, access to a computer device 1 is restricted. The computer device 1 can be any type of electronic device with a user interface, including but not limited to a stationary computer, a laptop computer, a tablet computer, a smartphone, a mobile phone, a special purpose electronic device (such as an automatic teller machine, vending machine.), etc. The computer device 1 can be a standalone computer or a network connected computer.

In order to unlock the computer device 1, an access control device 3 is provided. As explained in more detail below, the access control device 3 is connected to the computer device 1, which is thus controllable by the access control device 3 to be set in an unlocked state or locked state. In this embodiment, the access control device 3 is provided close to the computer device 1.

As explained in more detail below, a mobile device 10 comprises a sensor to detect taps by a user 9. Moreover, there is a user input device to detect the same taps of the user 9. Based on data from the sensor and the user input device, the access control device 3 can authenticate the user and thus grant or deny access. Once authenticated, valid authorisation can optionally be a condition to grant access.

When access is granted, the access control device 3 sends a match signal to the computer device 1, whereby the computer device 1 is set in an unlocked state. In this embodiment, this can e.g. imply a signal over a wire-based communication, e.g. using Universal Serial Bus (USB), Ethernet, a serial interface (such as RS-232, RS-485, etc.), a parallel interface (such as Centronics) or even a simple electric connection or alternatively a wireless interface. It is to be noted that the access control device 3 can be located in the vicinity of the computer device 1 or it can be located remotely (e.g. in or in the vicinity of a network authentication node), in communication with the computer device over a network. When the computer device 1 is in an unlocked state, the user 9 can interact with the computer device 1 as desired. In this way, access to the computer device 1 is controlled by the access control device 3. When the computer device 1 is a network connected computer, access to the computer device 1 may also include access to the connected network.

The embodiment shown in FIG. 1B is similar to the embodiment of FIG. 1A and only differences will be explained now. In FIG. 1B, the access control device 3 is included in the mobile device 10 in the form of software and/or hardware.

Again, the access control device 3 obtains sensor data from both the user input device and the mobile device sensor to determine whether to grant access. If access is granted, the access control device 3 sends a match signal to the computer device 1 over the wireless interface between the mobile device 10 and the computer device 1.

The embodiment shown in FIG. 1C is similar to the embodiment of FIG. 1A and only differences will be explained now. In FIG. 1C, the access control device 3 is included in the computer device 1 in the form of software and/or hardware.

Figure 2A:
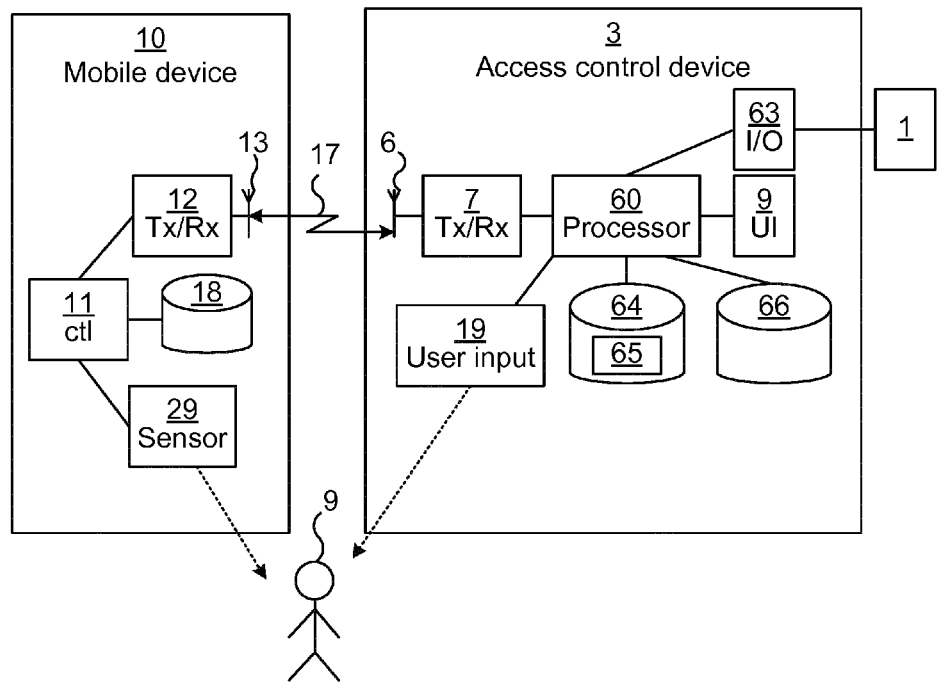
FIGS. 2A-C are schematic diagrams illustrating some components of the mobile device, the access control device and computer device of FIG. 1 and how these interact according to different embodiments.
Figure 2B:
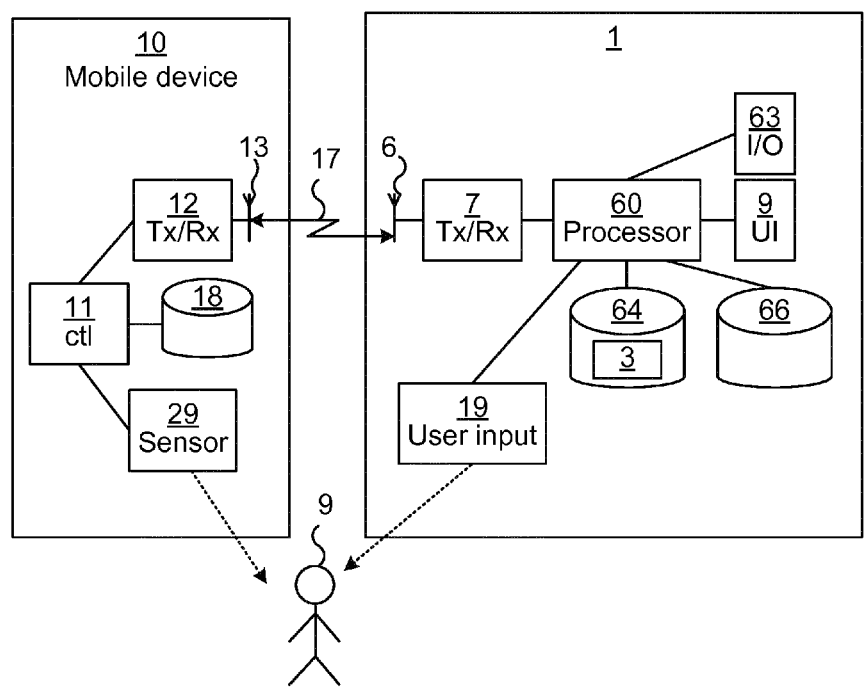
Figure 2C:
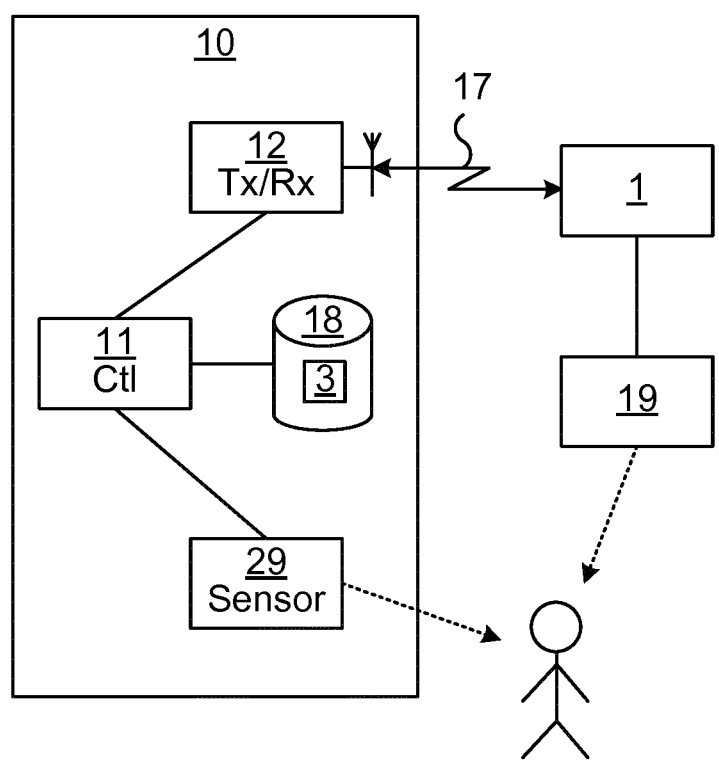

FIGS. 2A-C are schematic diagrams illustrating some components of the mobile device 10, the access control device and the computer device 1 of FIGS. 1A-C and how these interact according to different embodiments.

The mobile device 10 and the access control device 3 interact using a wireless interface 17 so that the access control device 3 can determine whether to grant or deny access. The wireless interface 17 is any suitable current or future wireless interface allowing communication between the mobile device 10 and the access control device 3 and can e.g. be based on Bluetooth, Bluetooth Low Energy (BLE), Radio Frequency Identification (RFID), Near Field Communication (NFC), any of the IEEE 802.11 standards, etc.

The mobile device 10 comprises a transceiver 12 connected to an antenna 13 for the wireless interface 17. Furthermore, the mobile device 10 comprises a controller ii which can be any combination of one or more of a suitable central processing unit (CPU), multiprocessor, microcontroller unit (MCU), digital signal processor (DSP), application specific integrated circuit etc., capable of executing software instructions or otherwise controllable to behave according to predetermined logic. The mobile device 10 may be implemented as a mobile phone, a smartphone, a key fob, credit card shaped device, etc.

A memory 18 is provided which can optionally store credential data of the mobile device 10. The credential data can be used in an authentication process to determine whether the mobile device is authenticated as a condition to be granted access to the computer device. The memory 18 can be any combination of read and write memory (RAM) and read only memory (ROM). The memory 18 may also comprise persistent storage, which, for example, can be any single one or combination of solid state memory, magnetic memory, or optical memory storing a computer program with software instructions.

A mobile device sensor 29 detects taps of the user 9 of the mobile device 10.

In one embodiment, the mobile device sensor 29 is implemented using an accelerometer. The accelerometer can detect acceleration, and thus movement, in at least one dimension, and optionally in three dimensions.

In one embodiment, the mobile device sensor 29 is implemented using a camera. The camera can detect movement by capturing images of the user 9 and/or capturing images of the surroundings, and analysing differences in these images over time. The mobile device sensor 29 generates sensor data of which at least a subset is transmitted to the access control device 3 over the wireless interface 17. Optionally, the sensor data is transformed by the processor prior to transmission, e.g. to compress data, to filter the sensor data and/or to transform the data in a suitable format for transmission.

Optionally, the mobile device 10 is a wearable device, such as an armband, a watch or a ring. When the mobile device 10 is fixed to the user 9, this improves the capability of the mobile device sensor 29 to detect movement of a body part of the user 9, especially when fixed to a limb (e.g. arm) of the user 9.

Other components of the mobile device 10, such as user interface components, etc. are omitted here for reasons of clarity.

Looking now to the access control device 3, this comprises a transceiver 7 with a connected antenna 6. The transceiver 7 and the mobile device 10 interact over a wireless interface 17 for sending sensor data from the mobile device 10 and optionally to exchange digital authentication data with the mobile device 10. Optionally, the transceiver 7 and antenna 6 are provided externally from the access control device 3.

A processor 60 controls the general operation of access control device 3. The processor 60 can be any combination of one or more of a suitable central processing unit (CPU), multiprocessor, microcontroller unit (MCU), digital signal processor (DSP), application specific integrated circuit (ASIC) etc., capable of executing software instructions or otherwise configured to behave according to predetermined logic. Hence, the processor 60 can be capable of executing software instructions 65 stored in a memory 64, which can thus be a computer program product. The processor 60 can be configured to execute the method described with reference to FIG. 3 below.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60, for instance digital authentication data. The data memory 66 can be any combination of read and write memory (RAM) and read only memory (ROM).

The access control device 3 further comprises an I/O interface 63 for communicating with other external entities such as the computer device 1. Such communication may be wire-based, e.g. using Universal Serial Bus (USB), Ethernet, or a serial interface (such as RS-232, RS-485, etc.), a parallel interface (such as Centronics) even a simple electric connection (e.g. to the computer device 1). Alternatively or additionally, the connection can be wireless, e.g. using Bluetooth, BLE, any of the IEEE 802.11 standards, wireless USB, etc. Optionally, the access control device 3 also includes a user interface, e.g. comprising any one or more of a keypad, light emitting diodes (LED) or other lights, a display (optionally touch sensitive), etc.

A user input device 19 detects taps of the user 9 of the mobile device 10. The user input device 19 is not carried by the user and is instead stationary. The user input device 19 can be loosely placed on a surface such as a table, or could be mounted to a fixed physical structure. The user input device 19 can form part of the access control device 3 (as shown) or can be external to the access control device and connected to the access control device 3 (not shown). The user input device 19 can e.g. be a key, button, keyboard, mouse button, touchpad button, etc. The tap is to be interpreted as any distinct user input, such as a key press, a button press, a touchpad tap, etc. and can be thought of as an actuation of a user interface element by the user, in contrast with directional user input such as mouse movement, touch pad finger movement, etc. The analysis of the taps is more distinct and computationally less demanding compared to analysis of directional movement.

Other components of the access control device 3 are omitted in order not to obscure the concepts presented herein.

In FIG. 2B, an embodiment is shown which is similar to the embodiment of FIG. 2A. Here, however, the access control device 3 is included as part of the computer device 1. The components shown in FIG. 2A of the access control device are then completely or partly shared between the access control device and the computer device. For instance, the user input device 19 can then form part of a regular user interface of the computer device 1, such as a keyboard, a touchpad button, etc. The operation of the access control device 3 is then controlled by software instructions 3 stored in the persistent memory 64 of the host device, in this case the computer device 1.

In FIG. 2C, the access control device 3 is implemented using software instructions 3 stored in the persistent memory 18 of the mobile device. This embodiment corresponds to the embodiment shown in FIG. 1B.

Here, the mobile device 10 communicates with the computer device 1 e.g. to be able to send a match signal when access is granted.

The access control device 3 obtains sensor data from both the mobile device sensor 29 and the user input device 19 and matches the sensor data as part of the process to grant access.

The user input device 19 can communicate with the mobile device 10 and thus the access control device 3 over the wireless interface either as shown, via the computer device 1, or using a direct wireless link between the user input device 19 and the mobile device 10.

Figure 3:
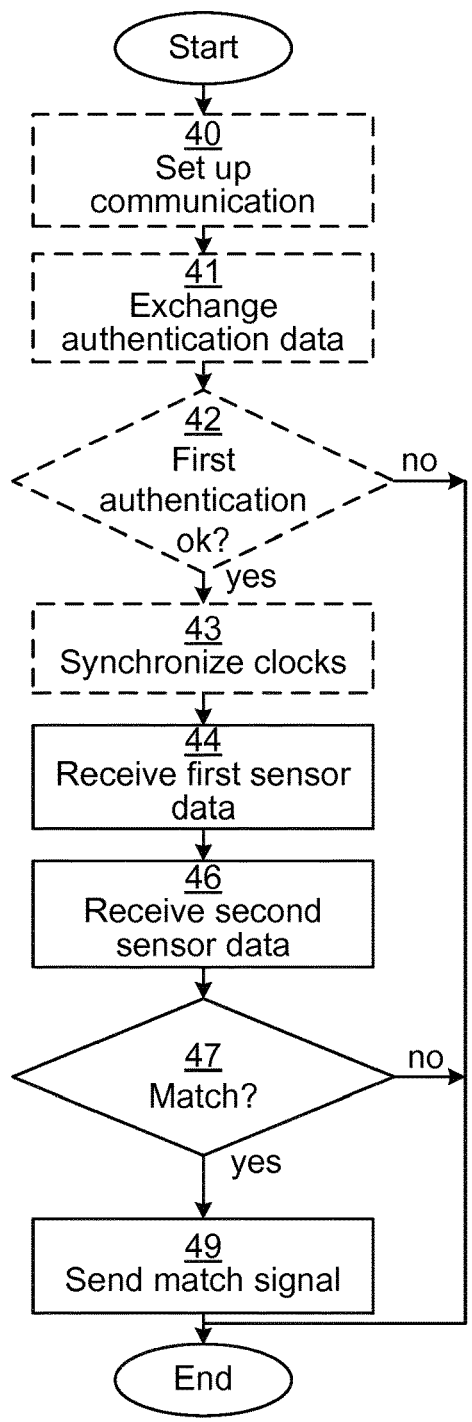
FIG. 3 is a flow chart illustrating embodiments of methods performed in the access control device of FIGS. 1A-C or FIGS. 2A-C for conditionally authenticating a user for access to a computer device.

FIG. 3 is a flow chart illustrating embodiments of methods performed in the access control device 3 of FIGS. 1A-C or FIGS. 2A-C for conditionally authenticating a user for access to a computer device.

The method can be started periodically or when proximity of a user or computer device is detected.

In an optional set up communication step 40, the wireless interface (17 of FIG. 2B) is established. Alternatively, the wireless interface has been set up prior to starting the method, in which case this step does not need to be performed.

In an optional exchange authentication data step 41, digital authentication data is exchanged between the access control device and the mobile device (when the access control device is not in the mobile device) or the computer device (when the access control device is in the mobile device). This exchange of authentication data can e.g. comprise a challenge and response communication, where the access control device sends a challenge to the other device (mobile device/computer device) and the other device sends a response. The challenge and response communication could also occur in the reverse direction.

In an optional conditional first authentication ok step 42, the access control device determines whether the mobile device is authenticated based on the digital authentication data. For instance, this can comprise the checking of the response with an expected result in a challenge and response procedure. Optionally, the authentication is performed using resources in the computer device or an authentication node in a network connected to the computer device. When the other device is authenticated, the method proceeds to the synchronise clocks step 43. Otherwise, the method ends.

In an optional synchronise clocks step 43, the time lines of sensor data from the user input device and sensor data from the mobile device sensor are synchronised. This can e.g. involve finding a common time reference.

Alternatively, the time synchronisation can occur by process where the two sides exchange their times to thereby obtain cross references to the corresponding times.

In the obtain first sensor data step 44, first sensor data is obtained. The first sensor data is based on the mobile device sensing a physical movement of a user using the mobile device sensor, e.g. a tap. The first sensor data can e.g. contain samples of an analogue signal detected by the mobile device sensor. In one embodiment, the first sensor data is based on accelerometer data.

When the access control device is implemented on the stationary side, the obtaining of first sensor data comprises receiving the first sensor data from the mobile device over the wireless interface (17 of FIGS. 2A-B).

When the access control device is implemented on the mobile device side, the obtaining of first sensor data comprises receiving the first sensor data from the mobile device sensor 29. The first sensor data can then be received as a signal from the mobile device sensor or by reading a memory accessible to both the mobile device sensor and the access control device, implemented using software instructions executing in the processor.

In an obtain second sensor data step 46, second sensor data is obtained. The second sensor data is based on a user input device detecting user input from a user. The second sensor data can e.g. contain time of actuations/taps detected by the user input device.

When the access control device is implemented on the stationary side, the obtaining of second sensor data comprises receiving the second sensor data from the user input device 19. The second sensor data can then be received as a signal from the user input device or by reading a memory accessible to both the user input device and the access control device.

When the access control device is implemented on the mobile device side, the obtaining of second sensor data comprises receiving the second sensor data from the user input device over the wireless interface (17 of FIG. 2C).

It is to be noted that the first sensor data and the second sensor data overlap in time to allow matching to be performed.

In a conditional match step 47, the access control device 3 determines whether the first sensor data matches the second sensor data by determining whether the first sensor data reflects a tap of the user and corresponds to a tap of the user also reflected in the second sensor data. The first sensor data and the second sensor data are determined to match only when the time difference between the two taps of the first sensor data corresponds to the time difference between the two taps of the second sensor data. Corresponds is here to be interpreted to be the same within a margin of error (of e.g. 10 ms). In other words, a match is determined when the same taps are found in the first sensor data and the second sensor data, which is determined by comparing the respective time differences between the two taps.

Optionally, a time difference is considered, such that a match between the first sensor data matches the second data only occurs when a time difference between a corresponding physical movement (i.e. one or both taps) is less than a threshold time difference, indicating concurrency of an event. Such a time difference can e.g. be 100 milliseconds. The time difference may require a synchronisation of a time scale for the first sensor data and for the second sensor data as explained above. Alternatively, the times at which the first sensor data and the second sensor data is obtained are used as reference points for the comparison in time.

Using this method, the intent of authentication is better controlled than if e.g. only radio frequency (RF) communication is used for authentication, e.g. using BLE, NFC, RFID, etc. In RF based communication, received signal strength is sometimes used to control range, but this is unreliable and depends on knowledge of transmitter strength. Using the user input device in the authentication process, the intent is better verified. For instance, intent in embodiments herein is shown by two actuations of the user input device, whereby the intent is clear.

By controlling the operative range better, the risk of inadvertent authentication is decreased. Inadvertent authentication can be a significant security risk e.g. in office environments where there are many people moving around.

Figure 4:
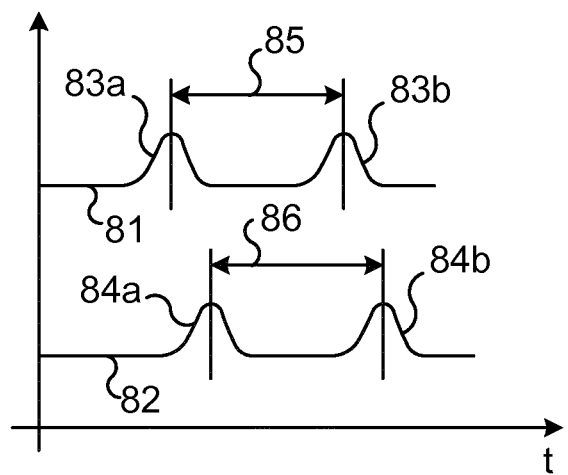
FIG. 4 is a schematic diagrams illustrating embodiments of how the matching performed in the flow chart of FIG. 3 can be implemented.

FIG. 4 illustrates an embodiment of this matching and is described in more detail below.

When a match is determined, the method proceeds to a send match signal step 49. Alternatively, when a match is determined, the method proceeds to a send match signal step 49. When no match is determined, the method ends.

In the send match signal step 49, a match signal is sent to the computer device. The match signal indicates the determined match. This can be a sufficient condition to unlock the computer device or other conditions may also need to be fulfilled. In this way, the computer device is set into an unlocked state, allowing access for the user to the computer device.

Using this method, a user movement is detected using both the mobile device sensor and the user input device and access is only granted if the movement matches.

It is to be noted that the order in which the first sensor data and the second data is obtained (in steps 44 and 46) is not important. However, the first sensor data and the second data need to relate to overlapping time periods in order to perform the matching. In one embodiment, the first sensor data and the second sensor data are both provided to the access control device in parallel. Optionally, the matching (step 47) is performed in parallel with the obtaining of sensor data (steps 44 and 46). Alternatively, the matching can be performed repetitively on chunks of the first sensor data and the second sensor data, optionally combined with a certain amount of historic data.

A number of embodiments will now be described to illustrate the flexibility and applicability of embodiments of the method of FIG. 3. Each one of these embodiments can optionally be combined with additional authentication (steps 41 and 42).

In one embodiment, the mobile device is a wearable device, e.g. in the form of an armband, watch or a ring. The mobile device sensor is an accelerometer and the user input device is a keyboard or a touchpad. To gain access, the user taps a hand or finger located on the same limb as the mobile device twice on the user input device. The mobile device sensor senses the vibrations propagated trough the body and the user input device also detects the taps. The mobile device sensor detects the taps as peaks in vibration which, when the duration between the taps detected by the mobile device and the user input device are compared, results in a positive match between the first sensor data and the second sensor data. Optionally, the sensor data of the mobile device sensor is only used in one dimension to focus the motion detection. This one dimension can be the dimension where the vibration is strongest.

In one embodiment, the mobile device is a mobile phone or key fob. The mobile device sensor is an accelerometer and the user input device is a keyboard or a touchpad. To gain access, the user simply taps the mobile phone twice on the user input device. The mobile device sensor detects the taps as peaks in vibration which, when the duration between the taps detected by the mobile device and the user input device are compared, results in a positive match between the first sensor data and the second sensor data.

When the conditional predefined movement step 48 is performed, only predefined movements result in a positive match, which increases the sense of control of the user. For instance, when the predefined movement is three taps within a certain amount of time, the user needs to perform this action to unlock the computer device.

When the steps 41 and 42 of the first authentication is performed, great balance between usability and security is provided. The first authentication can e.g. be implemented with automatic authentication and the matching is performed based on movement. In this way, the user can unlock the computer device by making a suitable body movement to prevent inadvertent unlocking, while great security is provided using the automatic authentication.

FIG. 4 is a schematic diagram illustrating embodiments of how the matching performed in the conditional match step 47 of the flow chart of FIG. 3 can be implemented. There is here a first signal 81 plotted comprising the first sensor data, originating from the mobile device sensor, and a second signal 82 plotted for the second sensor data, originating from the user input device. It is to be noted that it is not important here which signal is which as long as they are matched. The horizontal axis represents time and the vertical axis represents an amplitude of the respective signal levels.

There are two peaks 83*a-b* in the first signal 81. The two peaks 83*a-b* of the first signal 81 correspond to respective taps of the user. Also, there are two peaks 84*a-b* in the second signal 82. The two peaks 84*a-b* of the second signal 82 correspond to respective taps of the user. A first time difference 85 between the two peaks 83*a-b* of the first signal is determined. A second time difference 86 between the two peaks 84*a-b* of the second signal is determined.

The presence of a match or not can then be determined by comparing the first time difference 85 and the second time difference 86. These are considered to correspond to each other when they are equal, within a margin of error. The margin of error can e.g. be +−10 ms or even less, such as 1 ms.

Optionally, the time difference between the first peaks of the first signal 81 and the second signal 82 also need to be within a threshold, to further increase security.

When the first peaks are not compared in time, the time base of the two signals do not need to be synchronised, since only the peak time difference is compared between signals, not the timings themselves. Also, each time difference 85, 86 can be calculated with great accuracy since it only depends on a single respective signal 81, 82.

Figure 5:
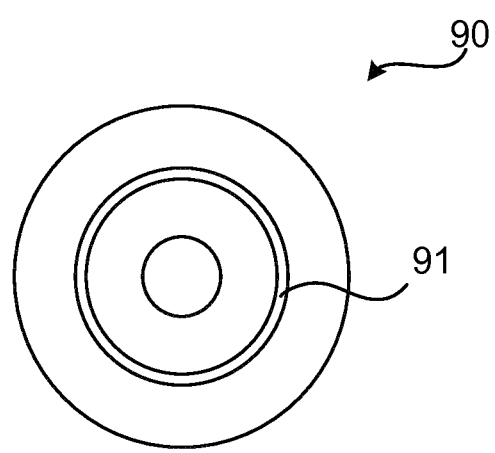
FIG. 5 shows one example of a computer program product comprising computer readable means.

FIG. 5 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIGS. 2A-B or the computer program product 18 of FIG. 2C. While the computer program 91 is here schematically shown as a track on the depicted optical disk, the computer program can be stored in any way which is suitable for the computer program product, such as a removable solid state memory, e.g. a Universal Serial Bus (USB) drive.

Here now follows a list of embodiments enumerated with roman numerals.

i. A method for conditionally authenticating a user for access to a computer device, the method being performed in an access control device connected to the computer device, the method comprising the steps of:

obtaining first sensor data being based on a mobile device sensing a physical movement of a user;

obtaining second sensor data being based on a stationary sensor sensing a physical movement of a user;

determining whether the first sensor data matches the second sensor data; and sending a match signal to the computer device when the first sensor data matches the second sensor data.

ii. The method according to embodiment i, further comprising the steps of:

exchanging digital authentication data with the mobile device;

determining whether the mobile device is authenticated based on the digital authentication data; and wherein the step of sending a match signal is only performed when the mobile device is authenticated.

iii. The method according to embodiment i or ii, wherein the step of determining whether the first sensor data matches the second data comprises determining that the first sensor data matches the second data only when a time difference between corresponding physical movements is less than a threshold time difference.

iv. The method according to any one of the preceding embodiments, further comprising the step of:

determining whether the first sensor data and the second sensor data match a predefined physical movement; and wherein the step of sending a match signal is only performed when the first sensor data and the second sensor data match the predefined physical movement.

v. The method according to any one of the preceding embodiments, wherein the access control device comprises the stationary sensor, and wherein the step of obtaining second sensor data comprises obtaining the second sensor data being based on the stationary sensor sensing a vibration.

vi. The method according to any one of the preceding embodiments, wherein in the step of obtaining first sensor data, the first sensor data is based on accelerometer data.

vii. An access control device arranged to conditionally authenticate a user for access to a computer device, the access control device comprising:

a processor; and a memory storing instructions that, when executed by the processor, causes the access control device to:

obtain first sensor data being based on a mobile device sensing a physical movement of a user;

obtain second sensor data being based on a stationary sensor sensing a physical movement of a user;

determine whether the first sensor data matches the second sensor data; and send a match signal to the computer device, connected to the access control device, when the first sensor data matches the second sensor data.

viii. The access control device according to embodiment vii, wherein the memory further stores instructions that, when executed by the processor, causes the access control device to:

exchange digital authentication data with the mobile device;

determine whether the mobile device is authenticated based on the digital authentication data; and wherein the instructions to send a match signal comprise instructions that, when executed by the processor, causes the access control device to only send the match signal when the mobile device is authenticated.

ix. The access control device according to embodiment vii or viii, wherein the instructions to determine whether the first sensor data matches the second data comprise instructions that, when executed by the processor, causes the access control device to determine that the first sensor data matches the second data only when a time difference between corresponding physical movements is less than a threshold time difference.

x. The access control device according to any one of embodiments vii to ix, wherein the memory further stores instructions that, when executed by the processor, causes the access control device to:

determine whether the first sensor data and the second sensor data match a predefined physical movement; and wherein the instructions to send a match signal comprise instructions that, when executed by the processor, causes the access control device to only send the match signal when the first sensor data and the second sensor data match the predefined physical movement.

xi. The access control device according to any one of embodiments vii to x, further comprising the stationary sensor, and wherein the instructions to obtain second sensor data comprise instructions that, when executed by the processor, causes the access control device to obtain the second sensor data being based on the stationary sensor sensing a vibration.

xii. The access control device according to any one of embodiments vii to xi, wherein the instructions to obtain first sensor data comprise instructions that, when executed by the processor, causes the access control device to obtain the first sensor data based on accelerometer data.

xiii. A computer device comprising the access control device according to any one of embodiments vii to xii.

xiv. A computer program for conditionally authenticating a user for access to a computer device, the computer program comprising computer program code which, when run on a access control device causes the access control device to:

obtain first sensor data being based on a mobile device sensing a physical movement of a user;

obtain second sensor data being based on a stationary sensor sensing a physical movement of a user;

determine whether the first sensor data matches the second sensor data; and send a match signal to the computer device, connected to the access control device, when the first sensor data matches the second sensor data.

xv. A computer program product comprising a computer program according to embodiment xiv and a computer readable means on which the computer program is stored.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for conditionally authenticating a user for access to a computer device, the method being performed in an access control device connected to the computer device, the method comprising:

obtaining first sensor data being based on a mobile device sensing a physical movement of a user;

obtaining second sensor data being based on a user input device detecting user input from a physical movement of a user;

determining whether the first sensor data matches the second sensor data, wherein the first sensor data reflects two taps of the user and the second sensor data reflects two taps of the user, and wherein the first sensor data and the second sensor data are determined to match only when the time difference between the two taps of the first sensor data corresponds to the time difference between the two taps of the second sensor data; and sending a match signal to the computer device when the first sensor data matches the second sensor data to authenticate the user and permit access with the access control device.

2. The method according to claim 1, further comprising the steps of:

exchanging digital authentication data with the mobile device;

determining whether the mobile device is authenticated based on the digital authentication data; and wherein the step of sending a match signal is only performed when the mobile device is authenticated.

3. The method according to claim 1, wherein the step of determining whether the first sensor data matches the second data comprises determining that the first sensor data matches the second data only when a time difference between corresponding a physical movement is less than a threshold time difference.

4. The method according to claim 1, wherein in the step of obtaining first sensor data, the first sensor data is based on accelerometer data.

5. An access control device arranged to conditionally authenticate a user for access to a computer device, the access control device comprising:

a processor; and a memory storing instructions that, when executed by the processor, causes the access control device to:

obtain first sensor data being based on a mobile device sensing a physical movement of a user;

obtain second sensor data being based on a user input device detecting user input from a physical movement of a user;

determine whether the first sensor data matches the second sensor data, wherein the first sensor data reflects two taps of the user and the second sensor data reflects two taps of the user, and wherein the first sensor data and the second sensor data are determined to match only when the time difference between the two taps of the first sensor data corresponds to the time difference between the two taps of the second sensor data; and send a match signal to the computer device, connected to the access control device, when the first sensor data matches the second sensor data to authenticate the user and permit access with the access control device.

6. The access control device according to claim 5, wherein the memory further stores instructions that, when executed by the processor, causes the access control device to:

exchange digital authentication data with the mobile device;

determine whether the mobile device is authenticated based on the digital authentication data; and wherein the instructions to send a match signal comprise instructions that, when executed by the processor, causes the access control device to only send the match signal when the mobile device is authenticated.

7. The access control device according to claim 5, wherein the instructions to determine whether the first sensor data matches the second data comprise instructions that, when executed by the processor, causes the access control device to determine that the first sensor data matches the second data only when a time difference between a corresponding physical movement is less than a threshold time difference.

8. The access control device according to claim 5, wherein the instructions to obtain first sensor data comprise instructions that, when executed by the processor, causes the access control device to obtain the first sensor data based on accelerometer data.

9. A computer device comprising the access control device according to claim 5.

10. A non-transitory computer readable means having a computer program stored thereon, the computer program for conditionally authenticating a user for access to a computer device, the computer program comprising computer program code which, when run on a access control device causes the access control device to:

obtain first sensor data being based on a mobile device sensing a physical movement of a user;

obtain second sensor data being based on a user input device detecting user input from a physical movement of a user;

determine whether the first sensor data matches the second sensor data, wherein the first sensor data reflects two taps of the user and the second sensor data reflects two taps of the user, and wherein the first sensor data and the second sensor data are determined to match only when the time difference between the two taps of the first sensor data corresponds to the time difference between the two taps of the second sensor data; and send a match signal to the computer device, connected to the access control device, when the first sensor data matches the second sensor data to authenticate the user and permit access with the access control device.

11. A computer program product comprising the non-transitory computer readable means according to claim 10.

* * * * *